(12) United States Patent
Link, II

(10) Patent No.: US 6,775,552 B2
(45) Date of Patent: Aug. 10, 2004

(54) METHOD AND APPARATUS FOR FIXING THE LOCATION OF A FIXED WIRELESS TERMINAL IN A WIRELESS NETWORK

(75) Inventor: Charles M. Link, II, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 316 days.

(21) Appl. No.: 09/742,764

(22) Filed: Dec. 20, 2000

(65) Prior Publication Data

US 2001/0018326 A1 Aug. 30, 2001

Related U.S. Application Data

(63) Continuation-in-part of application No. 09/476,064, filed on Dec. 30, 1999.

(51) Int. Cl.$^7$ ................................................. H04Q 7/20
(52) U.S. Cl. ...................... 455/456.1; 455/421; 455/410
(58) Field of Search ............................. 455/414.1, 410, 455/421, 423, 424, 446, 456.1, 67.11, 425, 435.1; 342/450, 463; 379/145

(56) References Cited

U.S. PATENT DOCUMENTS

| | | | |
|---|---|---|---|
| 5,257,399 A | * | 10/1993 | Kallin et al. ................. 455/434 |
| 5,515,419 A | | 5/1996 | Sheffer |
| 5,711,000 A | * | 1/1998 | Ploeg et al. .................. 455/423 |
| 5,751,789 A | | 5/1998 | Farris et al. |
| 5,765,103 A | | 6/1998 | Chang et al. |
| 5,809,123 A | | 9/1998 | Reynolds |
| 5,862,477 A | | 1/1999 | Wellard et al. |
| 5,896,411 A | | 4/1999 | Ali et al. |
| 5,905,950 A | * | 5/1999 | Anell .......................... 455/421 |
| 5,914,946 A | | 6/1999 | Avidor et al. |
| 5,983,117 A | | 11/1999 | Sandler et al. |
| 6,005,934 A | | 12/1999 | Pepper |
| 6,181,253 B1 | * | 1/2001 | Eschenbach et al. ... 340/825.37 |

* cited by examiner

Primary Examiner—Erika Gary
(74) Attorney, Agent, or Firm—Kirkpatrick & Lockhart LLP

(57) ABSTRACT

A method for fixing a location of a fixed wireless terminal. The method includes receiving a first plurality of telecommunication signals at the fixed wireless terminal, generating a first model of a network environment of the fixed wireless terminal based on an identification code sent with each of the first plurality of received signals, wherein the identification code is indicative of a base station from which the signal was transmitted, and the signal strength of each of the first plurality of received signals, receiving a second plurality of telecommunication signals at the fixed wireless terminal, generating a second model of the network environment of the fixed wireless terminal based on an identification code sent with each of the second plurality of received signals, wherein the identification code is indicative of a base station from which the signal was transmitted, and the signal strength of each of the second plurality of received signals, and determining whether the first and second models differ beyond a predetermined limit.

24 Claims, 8 Drawing Sheets

METHOD AND APPARATUS FOR FIXING THE LOCATION OF A FIXED WIRELESS TERMINAL IN A WIRELESS NETWORK

CROSS-REFERENCE TO RELATED APPLICATIONS

The present application is a continuation-in-part under 35 U.S.C. § 120 of copending U.S. patent application Ser. No. 09/476,064, filed Dec. 30, 1999.

STATEMENT REGARDING FEDERALLY SPONSORED RESEARCH AND DEVELOPMENT

Not Appllicable.

BACKGROUND OF THE INVENTION

1. Field on Invention

The field of the present invention relates generally to wireless telecommunications and, more particularly, to methods and apparatuses for fixing the location of a fixed wireless terminal in a wireless network.

2. Description of Background

Throughout the world, there exist places where conventional landline telephone service is unavailable or inadequate. In addition, it is typically expensive and time-consuming to build a wireline network. In recent years, however, wireless telephone service has proliferated throughout the world, including places that never offered landline service. Wireless service can support many potential customers without the capital expenses associated with digging up streets and wiring older business districts. Installation of a wireless network can be accomplished in a matter of months, rather than the years associated with installing a wireline network. Thus, many locations around the world that do not have an embedded wireline network or have an inadequate wireline network are seeking to implement wireless solutions.

Wireless service, however, is generally more expensive than equivalent wired service. Wireless service providers generally believe that mobile flexibility demands a premium service charge and, unlike a dedicated wireline network, wireless customers share a limited resource-RF spectrum bandwidth. Thus, wireless service providers typically offer usage-sensitive pricing, which has a tendency to control access to the wireless network and limit wasteful use. Wireless service users in locations with no or inadequate landline service, however, perceive that wireless service should be offered at rates competitive to wireline networks.

As a result, some wireless service providers offer fixed wireless solutions in these locations at a discount over mobile wireless service. Offering fixed wireless service at lower rates than mobile wireless service presents the technical dilemma of differentiating between regular mobile wireless users and fixed wireless users. The typical fixed wireless system includes a fixed wireless terminal for interfacing a fixed wireless user's telephone unit with a mobile switching center (MSC). The fixed wireless terminals are preferably confined to a fixed location, such as mounted to the side of a user's residence or equipment rooms, basements, attics, and closets, within the geographic area serviced by the fixed wireless network. However, because the fixed wireless terminal is essentially a wireless device, it may simply be removed from its fixed location and thus become a de facto mobile telephone interface.

A variety of solutions have been offered to prevent misuse and abuse of fixed wireless systems. One prior solution has been to offer specific location or home-zoning pricing plans, in which, for example, calls originating from and terminating at a particular cell site are subject to a fixed wireless rate, and calls which do not originate and terminate at the particular site are subject to the mobile rate. Home-zoning plans, however, are difficult to implement, especially in urban areas, where cell configurations may periodically change during periods of high wireless volume. Moreover, such a solution is relatively expensive to implement, in part because the existing billing system would have to be rewritten to support the functionality.

Another suggested solution is to incorporate Global Positioning System (GPS) receivers into fixed wireless terminals to generate accurate readings with respect to the physical location of a user. That solution, however, would require that the hardware and software supporting the GPS system be installed in all terminals, and thus would likely increase the cost of the terminal.

Another prior solution involves installing a motion detector, such as a mercury switch, in the fixed wireless unit. The motion detector is in communication with a controller for the fixed wireless unit, and instructs the controller to disable the unit when motion is detected. Such a system, however, is susceptible to tampering or sabotage which may render the motion detector nonfunctional.

Many other attempts have been made at restricting or controlling access or determining location of a wireless terminal. For example, it is known to restrict call setup by defining a fixed subscription area (FSA) in the mobile switching center (MSC). Any attempts by the subscriber terminal to access the system will be denied or redirected to accesses within the FSA. This prohibits significant movement of the fixed subscriber, but allows normal subscriber access within, near, or slightly outside of the cell coverage area of the FSA. The major disadvantage with this system is that extensive changes are required in the MSC operating software.

In addition, a method specifically designed to support TDMA wireless fixed operation is known which involves changes to the MSC operating software by defining a location area identity (LAI), not unlike the FSA previously described. The switch maintains a list of handover candidates for the fixed wireless terminal. Any time the terminal moves beyond the fixed area, a handover is attempted to one of the handover candidates. Further, a timing advance (TA) value is maintained for each cell in the candidate list. This TA value is essentially a compensation value for the round trip time of a signal from the base station to the wireless terminal. If the TA value for the home cell or any handover candidate cell is out of range of the stored value, a violation signal is sent to the system operator. Further call termination is possible.

Other more complex and accurate solutions have been developed. For instance, it is known to determine the location of a wireless terminal by measuring the relative time of arrival of a single data packet transmitted by each of three independent transmitting antennas. Because the locations of the antennas are known, the receiver can compute its own location. Again, however, such a method requires extensive system changes to support the transmission of the data packets by three base stations or, at the very least, three spatially diverse antenna locations.

According to another known method of determining the position of a subscriber terminal, a mobile unit utilizing a plurality of range transceivers located at known fixed locations are adapted to transmit approximately synchronized digital range signals. This system appears to mimic the functionality of the global GPS system, although implemented with frequencies assigned to the wireless provider.

The above-described solutions, though all plausible for location determination, are not entirely suitable for a simple fixed wireless device location fixer. They all require extensive system modifications. They all require extensive changes to the MSC operating software or to some ancillary devices. Another disadvantage of the latter two solutions is they not only require extensive system development, but they also require frequency spectrum, a quite valuable commodity.

Therefore, there exists a need for a method and apparatus to fix the location of a fixed wireless terminal which eliminates the need for additional hardware and installation expenses. There also exists a need for a method and apparatus to fix the location of a fixed wireless terminal which would reduce the likelihood tampering, sabotage, and fraud.

BRIEF SUMMARY OF THE INVENTION

The present invention provides a practical implementation for fixing the location of a fixed wireless terminal based on telecommunication signals, such as signals received from base stations of a fixed wireless network. The signals are received on one or more channels and are used to construct models of the network environment of the fixed wireless terminal at different times, such as periodically or each time the terminal is used. The most recent model is compared to one or more previous models to determine if the fixed wireless terminal has changed locations, i.e., if it is mobile. The models may be constructed from one or more features of the received signals.

According to one embodiment of the present invention, the network environment models are constructed from identification codes sent with each of the signals. The identification codes are typically transmitted with telecommunication signals in a mobile telecommunications network to ensure that a mobile telecommunications device is communicating with the proper base station. For example, in a digital network, a digital verification color code (DVCC) is typically sent with all signals on digital control channels. According to another embodiment, models are constructed from digital color codes and their corresponding analog control channel or supervisory audio tones and their corresponding analog voice channel.

According to another embodiment, the present invention generates network environment models based on the strength of the received telecommunications signals. In addition, the models may include the signal strength of the received signals on certain channels in conjunction with the identification codes for those channels. According to yet another embodiment, the present invention monitors a time of arrival of signals received from different base stations to generate the network environment models.

If the most recent model and a previous model of the network environment sufficiently match, the present invention assumes that the location of the fixed wireless terminal has not changed. Conversely, if the models do not sufficiently match, the present invention assumes that the location of the fixed wireless terminal has changed and that, therefore, the fixed wireless terminal is mobile. If the fixed wireless terminal is mobile, the present invention may prevent a user from accessing the network via the fixed wireless terminal for a period of time, such as twenty-four hours. To ameliorate such potentially harsh ramifications, the present invention may be programmed to only prevent access to the network if the fixed wireless terminal is determined to be mobile on a specified number of occasions within a certain time period. Moreover, the present invention may be programmed to nevertheless permit access to the network for identifiable emergency purposes even if access would be otherwise prevented.

Thus, the present invention fixes the location of a fixed wireless terminal and prevents its use as a de facto mobile telecommunications device without the expensive additional hardware. In addition, the present invention represents an advancement over the prior art because it is not readily susceptible to tampering, fraud, or sabotage. These and other benefits of the present invention will be apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in a typical fixed wireless terminal or fixed wireless network. For example, specific operating system details and modules contained in the controller of the fixed wireless terminal are not shown. Those of ordinary skill in the art will recognize that these and other elements may be desirable to produce a system incorporating the present invention. However, because such elements are well known in the art, and because they do not facilitate a better understanding of the present invention, a discussion of such elements is not provided herein.

Figure 1:
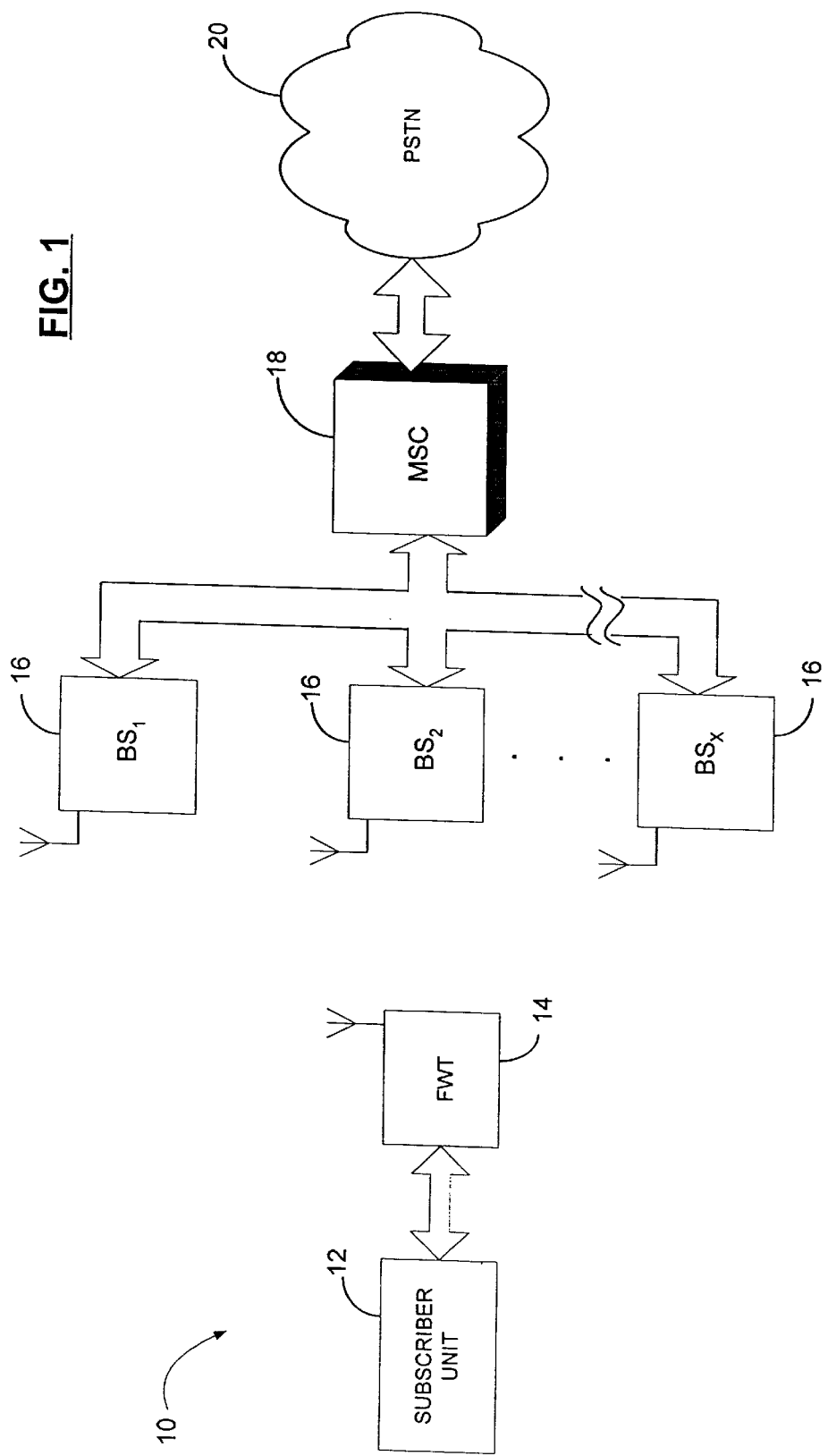
FIG. 1 is a block diagram of the fixed wireless network according to one embodiment of the present invention.

FIG. 1 is a block diagram illustrating a typical fixed wireless network 10. The network includes a subscriber unit 12, a fixed wireless terminal (FWT) 14, a number of base stations ($BS_1$–$BS_x$) 16, a mobile switching center (MSC) 18, and a public switched telephone network (PSTN) 20. The base stations 16, MSC 18, and PSTN 20 may be considered to comprise a mobile network, inasmuch as they support mobile telecommunications. The subscriber unit 12 may be any wireless telecommunications device including, for example, a telephone, telecopier, or modem. The subscriber unit 12 may communicate with the fixed wireless terminal 14 by, for example, conventional twisted pair wiring or radio signals. The fixed wireless terminal 14 is the interface between the subscriber unit 12 and the mobile network. The fixed wireless terminal 14 receives telecommunication signals from and transmits telecommunication signals to the base stations 16 according to an air-interface communication scheme such as, for example, cellular analog, FDMA, TDMA, CDMA, or GSM. Associated with each base station 16 is a cell site for which the base station 16 provides wireless coverage. The base stations 16 and FWT 14 can communicate over many different channels so that each base station 16 may simultaneously communicate with many FWTs 14 within the cell site. Cell sites often overlap and may change configurations with usage patterns or weather conditions. The base stations 16 communicate with the MSC 18 by, for example, an SS7 switching trunk network or an ISDN (integrated service digital network). The MSC 28 may communicate with the PSTN 20 by, for example, an SS7 switching trunk network, an ISDN, or a TCP/IP network.

The fixed wireless network 10 may be implemented in areas where landline service does not exist or is inadequate. Accordingly, a user of the subscriber unit 12 is provided telecommunications service through the wireless network via the fixed wireless terminal 14. Fixed wireless users of the network 10 may be charged less than mobile users. Because, however, the fixed wireless terminal 14 is a wireless telecommunications device, a user could realize mobile functionality at fixed wire rates by transporting the fixed wireless terminal 14 between various geographic locations. Therefore, it is typically necessary to fix the location of the fixed wireless terminal 14, such that a user may only achieve wireless functionality from a single or fixed location. Typically, fixed wireless terminals 14 are mounted to sides of buildings or in attics, basements, and equipment rooms. The desired fixed location of a fixed wireless terminal 14 may be within only a single cell site, or it may be in a location serviced by a number of cell sites. The present invention is directed to a method and an apparatus for determining the location of the fixed wireless terminal 14.

Figure 2:
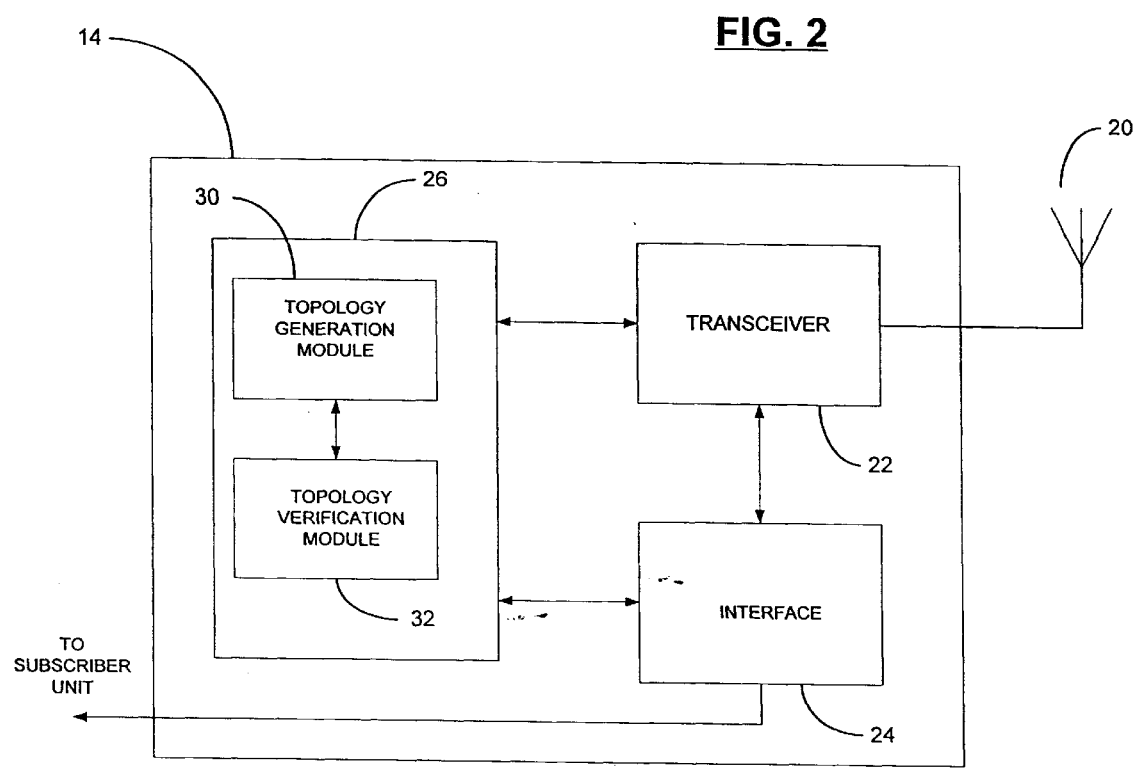
FIG. 2 is a block diagram of a fixed wireless terminal for the fixed wireless network of FIG. 1 according to one embodiment of the present invention.

FIG. 2 is a block diagram of the fixed wireless terminal 14 of FIG. 1 according to one embodiment of the present invention. The fixed wireless terminal 14 includes an antenna 20, a transceiver 22, an interface 24, and a controller 26. The antenna 20 is for receiving and transmitting telecommunication signals to and from the base stations 16. Alternatively, the fixed wireless terminal 14 may include a different number of antennas 20, such as two antennas, wherein one antenna is for transmitting signals and one antenna is for receiving signals. The transceiver 22 receives information, via the antenna 20, such as voice and data information, transmitted by the base stations 16 modulated according to the air-interface communication scheme employed by the fixed wireless network 10. For example, if the fixed wireless network 10 uses TDMA, the transceiver 22 is a TDMA compliant transceiver. The interface 24 is in communication with the transceiver 22, and provides protocol and/or signal format conversion between the subscriber unit 12 and the transceiver 22.

The controller 26 is in communication with the transceiver 22 and the interface 24 and may be implemented as, for example, a microprocessor, an application specific integrated circuit (ASIC), or a personal computer. The controller 26 includes a topology generation module 30 and a topology verification module 32, which may be implemented using any type of computer instruction, such as microcode, and can be stored in, for example, an electrically erasable programmable read only memory (EEPROM) or can be configured into the logic of the controller 26. The modules 30 and 32 may alternatively be implemented as software code to be executed by the controller 26 using any suitable computer language, such as C or C++ using, for example, conventional or object-oriented techniques. The software code may be stored as a series of instructions or commands on a computer-readable medium, such as a random access memory (RAM), a read-only memory (ROM), magnetic media such as a hard-drive or a floppy disk, or optical media such as a CD-ROM.

Each cell site typically has a unique identification code sent with the telecommunications signals transmitted to and from the base station 16 providing coverage for the particular cell site. The identification codes are used to distinguish the telecommunications signals transmitted to and from one base station 16 from the signals transmitted to and from other base stations 16. The identification codes may only be sent with signals transmitted over certain channels. Such identification mechanisms are necessary for most wireless networks to ensure that the correct mobile systems unit is in communication with the proper base station 16 given that mobile networks typically require the multiplexing of numerous signals onto a single channel.

According to one embodiment of the present invention, the topology generation module 30 generates models of the external network environment of the FWT 14 based on the identification codes in the telecommunications signals received from the base stations 16. The topology generation module 30 may generate the models by scanning the signal channels, which carry signals from one or more base stations 16, and recording the signal strength and identification codes for each of the scanned channels. The identification codes may only be recorded for signals above a certain threshold signal strength. The model may, for example, be embodied as a table containing the strength and identification code for the signals received at each channel. The particular signals received will depend on the location of the FWT 14.

The topology generation module 30 may generate the network environment model based upon different types of identification codes. For example, for a digital network, each base station 16 may transmit its own unique identifying digital verification color code (DVCC) with signals transmitted over its control channels. A DVCC is typically an 8-bit code transmitted by a base station 16 and used to generate a coded digital verification color code (CDVCC). The CDVCC is typically a 12-bit data field containing the 8-bit DVCC and four protection bits, sent in each time slot to and from mobile stations, such as the fixed wireless terminal 14. Because the DVCC is typically 8-bits, up to 256 unique cell site identifying codes may be used, although typically some codes, such a 00000000, are not used. Thus, for a digital network, the topology generation module 30 may generate models of the network environment of the fixed wireless terminal 14 by associating each received signal on a control channel with the DVCC sent with the signal.

Figure 2A:
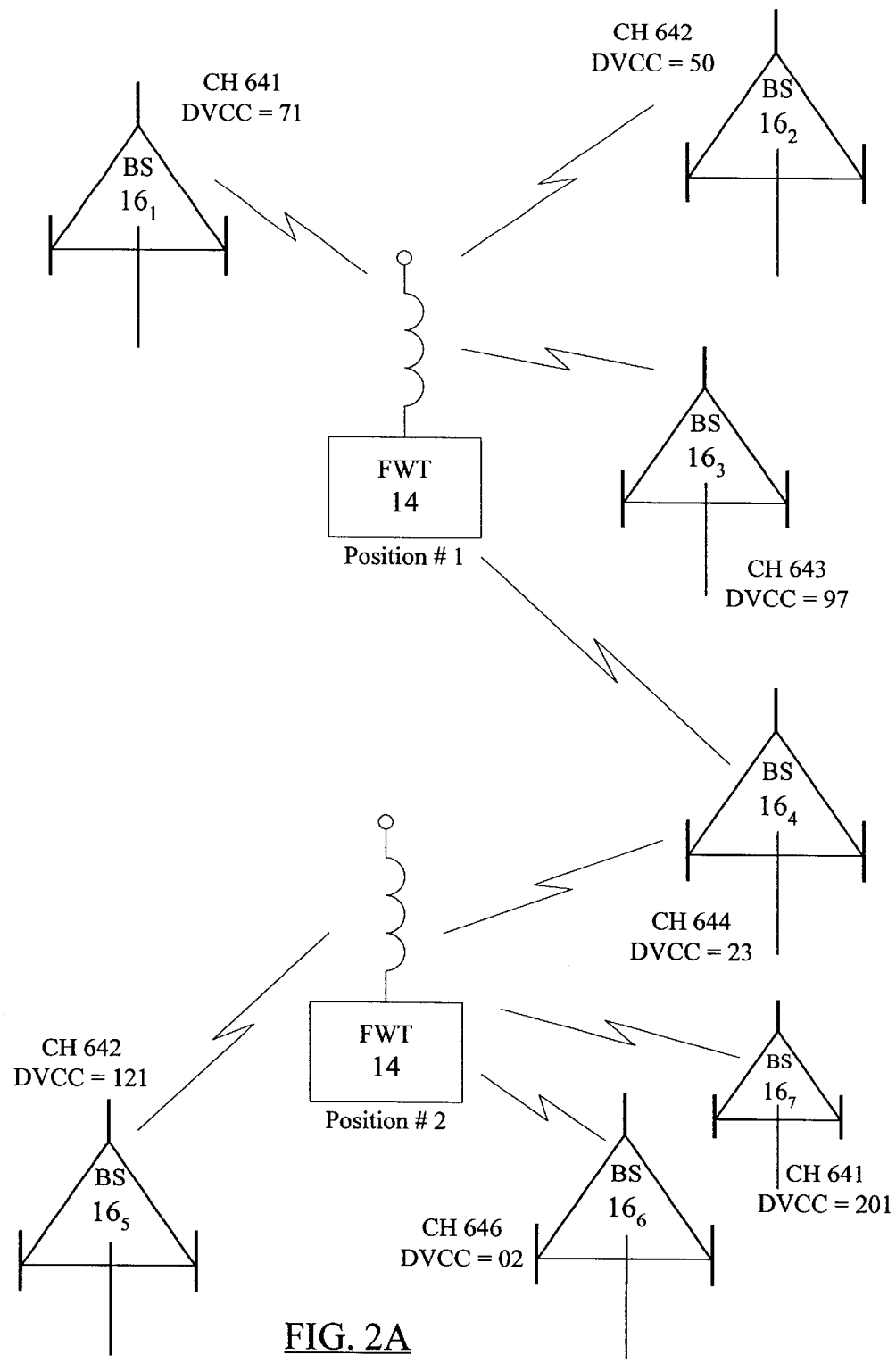
FIG. 2A is a diagram of the network of FIG. 1 wherein the DVCC of telecommunications signals sent on digital control channels from the base stations are used to fix the location of the fixed wireless terminal.

FIG. 2A is a diagram of a portion of the network 10 according to such an embodiment using the DVCC of the telecommunications signals sent on digital control channels from the base stations 16 to fix the location of the FWT 14. According to such an embodiment, the FWT 14 assembles a table of probable control channels that may be used as digital control channels according to, for example, IS-136. The FWT 14 may have a receiver sensitivity (SINAD) of, for example, −116 dBm. Table 1 is an example of the network environment model of the FWT 14 at position 1 in FIG. 2A according to such an embodiment.

TABLE 1

| Channel | DVCC (decimal) |
|---|---|
| 641 | 71 |
| 642 | 50 |
| 643 | 97 |
| 644 | 23 |
| 645 | N/A |
| 646 | 02 |
| 647 | N/A |
| 648 | N/A |
| 649 | N/A |
| 650 | N/A |

At position 1, for example, the FWT 14 is unable to receive and decode the telecommunications signals on channel 646, from BS 16$_6$, because the signal strength is lower than necessary for adequate demodulation. The FWT 14 is unable to receive and demodulate the second appearances of channels 641 and 642 due to the distance from the base stations and due to the local signals from BS 16$_1$ and BS 16$_2$.

Table 2 is an example of a network environment model of the FWT 14 at position 2 in FIG. 2A.

TABLE 2

| Channel | DVCC (decimal) |
|---|---|
| 641 | 201 |
| 642 | 121 |
| 643 | N/A |
| 644 | 23 |
| 645 | N/A |
| 646 | 02 |
| 647 | N/A |
| 648 | N/A |
| 649 | N/A |
| 650 | N/A |

At position 2, for example, the FWT 14 is unable to receive and decode the telecommunications signals on channel 643 from BS 16$_3$ because the signal strength is lower than necessary for adequate demodulation. In addition, the FWT 14 is unable to receive and demodulate the first appearances of channels 641 and 642 due to the distance from the base stations and due to the local signals from BS 16$_5$ and BS 16$_7$.

According to another embodiment, each base station 16 may transmit its own unique identifying digital color code (DCC) with telecommunication signals transmitted on all forward analog control channels to detect capture of a base station by an interfering mobile station. Thus, the topology generation module 30 may generate models of the network environment by associating each received telecommunication signal on an analog control channel with the DCC sent with the signal.

Figure 2B:
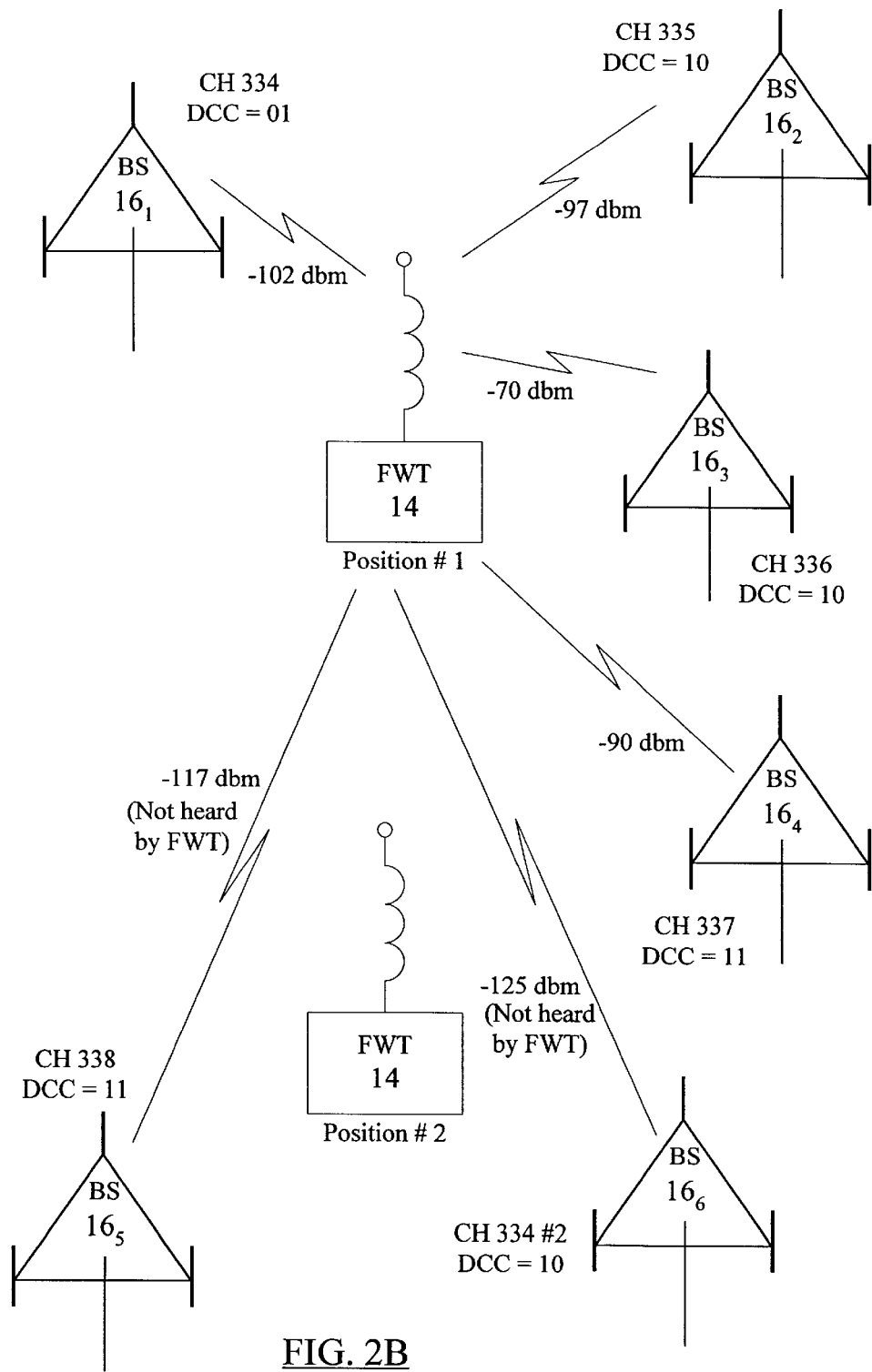
FIG. 2B is a diagram of the network of FIG. 1 wherein the DCC of telecommunications signals sent on analog control channels from the base stations are used to fix the location of the fixed wireless terminal.

FIG. 2B is a diagram of a portion of the network 10 according to such an embodiment, wherein the DCC of the telecommunications signals sent on analog control channels from the base stations 16 are used to fix the location of the FWT 14. According to such an embodiment, the FWT 14 may assemble a table of all control channels that are normally used as conventional analog cellular control channels. The FWT 14 may have a receiver sensitivity (SINAD) of, for example, −116 dBm. Table 3 is an example of a network environment model of the FWT 14 at position 1 in FIG. 2B.

TABLE 3

| Channel | DCC (binary) | Signal Strength (dBm) |
|---|---|---|
| 334 (#1) | 01 | −90 |
| 335 | 10 | −97 |
| 336 | 10 | −70 |
| 337 | 11 | −90 |
| 338 | 11 | −117 |
| 334 (#2) | 10 | −110 |
| 339 | N/A | N/A |
| 340 | N/A | N/A |
| 341 | N/A | N/A |
| 342 | N/A | N/A |
| 343 | N/A | N/A |
| 344 | N/A | N/A |
| 345 | N/A | N/A |
| 346 | N/A | N/A |
| 347 | N/A | N/A |
| 348 | N/A | N/A |
| 349 | N/A | N/A |
| 350 | N/A | N/A |
| 351 | N/A | N/A |
| 352 | N/A | N/A |
| 354 | N/A | N/A |

At position 1, for example, the FWT 14 is unable to receive and decode the telecommunications signals on channel 338 from BS 16$_5$ because the signal strength is lower than necessary for adequate demodulation. In addition, the FWT 14 is unable to receive and decode the telecommunications signals on channel 334 (#2) from BS 16$_6$ because the channel 334 from BS 16$_1$ is utilized on a cell site closer to the FWT 14.

Table 4 is an example of a network environment model of the FWT 14 at position 2 in FIG. 2B.

TABLE 4

| Channel | DCC (binary) | Signal Strength (dBm) |
|---|---|---|
| 334 (#1) | 01 | −111 |
| 335 | 10 | −117 |
| 336 | 10 | −95 |
| 337 | 11 | −71 |
| 338 | 11 | −75 |
| 334 (#2) | 10 | −80 |
| 339 | N/A | N/A |
| 340 | N/A | N/A |
| 341 | N/A | N/A |
| 342 | N/A | N/A |
| 343 | N/A | N/A |
| 344 | N/A | N/A |
| 345 | N/A | N/A |
| 346 | N/A | N/A |
| 347 | N/A | N/A |
| 348 | N/A | N/A |
| 349 | N/A | N/A |
| 350 | N/A | N/A |
| 351 | N/A | N/A |
| 352 | N/A | N/A |
| 354 | N/A | N/A |

At position 2, for example, the FWT 14 is unable to receive and decode the telecommunications 30 signals on channel 334 from BS 16$_2$ because the signal strength is lower than necessary for adequate demodulation. In addition, at position 2, the DCC for channel 334 has changed from "01" to "10" because BS 16₆ is physically closer to the FWT 14 than BS 16₁. Also, a new channel (channel 338 from BS 16₁) is within range of the FWT 14 at position 2, and another channel (channel 335 from BS 16₂) is no longer within range.

According to another embodiment, each base station 16 may transmit its own unique analog color code or supervisory audio tone (SAT) with telecommunication signals sent on analog voice channels to identify the cell. An SAT may be comprised of different tones transmitted by the base stations 16 such as, for example, three different tones and a no-tone, for a total of four different code tones. For such an embodiment, the topology generation module 30 may generate models of the network environment by associating each received signal on an analog voice channel above a threshold signal strength with the SAT sent with the signal. Those and other features of the signals received by the FWT 14 may be used to generate the network environment model.

Figure 2C:
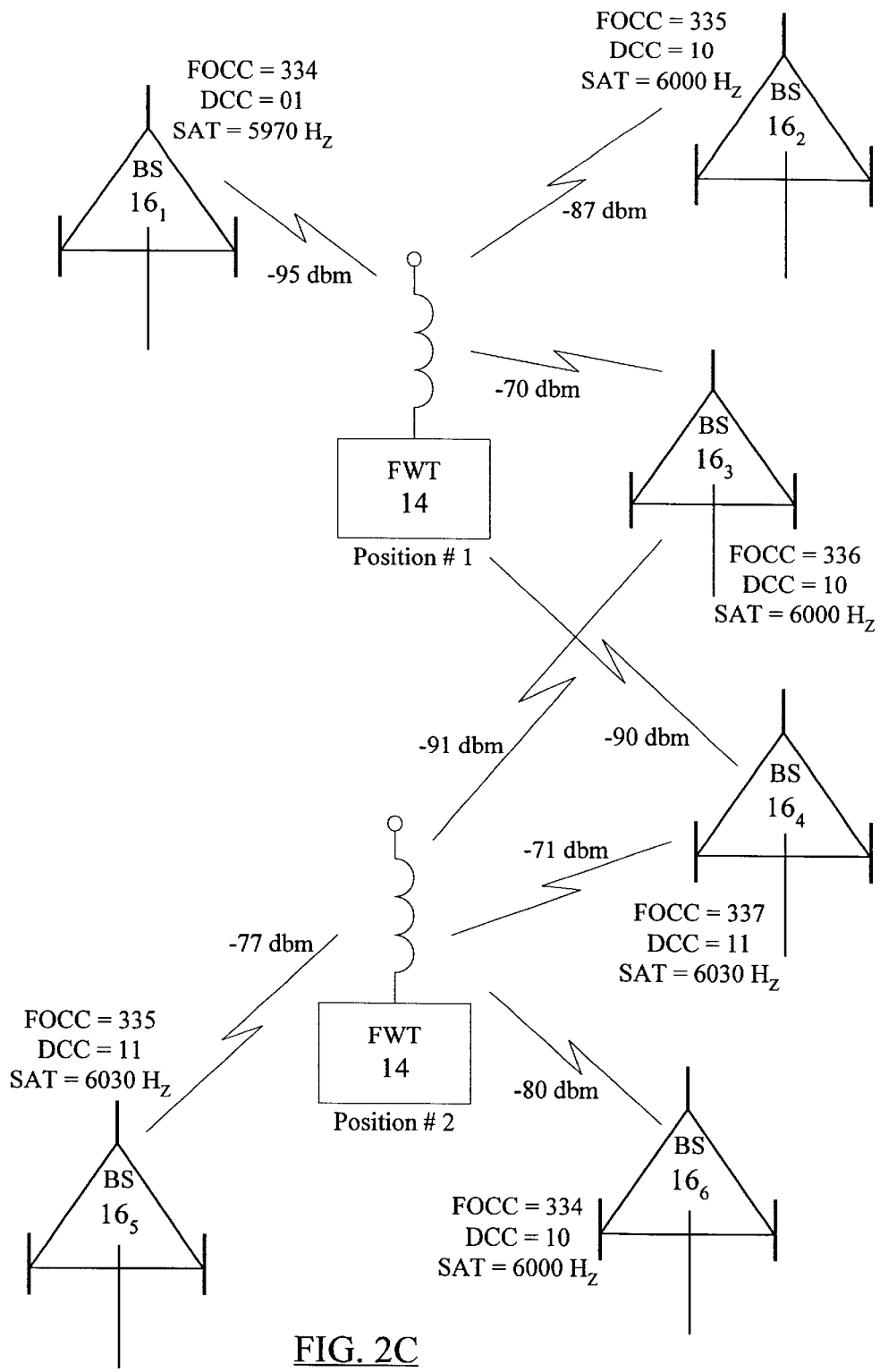
FIG. 2C is a diagram of the network of FIG. 1 wherein the SAT of telecommunications signals sent on analog voice channels from the base stations are used to fix the location of the fixed wireless terminal.

FIG. 2C is a diagram of a portion of the network 10 according to such an embodiment, wherein the SAT of the telecommunications signals from the base stations 16 are used to fix the location of the FWT 14. According to such an embodiment, the voice channels may be assigned to cells as follows:

BS 16₁: FOCC = 334, FVC = 355, 362, 369, 376, 383, 390, 397, 404, SAT = 5970
BS 16₂: FOCC = 335, FVC = 356, 363, 370, 377, 384, 391, 398, 405, SAT = 6000
BS 16₃: FOCC = 336, FVC = 357, 364, 371, 378, 385, 392, 399, 406, SAT = 6000
BS 16₄: FOCC = 337, FVC = 348, 365, 372, 379, 386, 393, 400, 407, SAT = 6030
BS 16₅: FOCC = 335, FVC = 356, 363, 370, 377, 384, 391, 398, 405, SAT = 6030
BS 16₆: FOCC = 334, FVC = 355, 362, 369, 376, 383, 390, 397, 404, SAT = 6000

According to this scenario, the value of the threshold signal strength may be set at, for example, −95 dBm. The FWT 14 may generate a table with every voice channel within the assigned band plan. For a B Band US cellular wireless network, those channels range from channel number 355 to 666, and 717 to 799.

Table 5 is an example of a network environment model of the FWT 14 at position 1 in FIG. 2C, although some of the channels are not included, and wherein SAT 0=no tone, SAT 1=5970 Hz, SAT 2=6000 Hz, and SAT 3=6030 Hz.

TABLE 5

| Channel | SAT |
|---|---|
| 355 | 1 |
| 356 | 2 |
| 357 | 2 |
| 358 | 3 |
| 359 | N/A |
| 360 | N/A |
| 361 | N/A |
| 362 | 1 |
| 363 | 2 |
| 364 | 2 |
| 365 | 3 |
| 366 | N/A |
| 367 | N/A |
| 368 | N/A |
| 369 | 1 |
| 370 | 2 |

TABLE 5-continued

| Channel | SAT |
|---|---|
| 371 | 2 |
| 372 | 3 |
| 373 | N/A |
| 374 | N/A |
| 375 | N/A |
| 376 | 1 |
| 377 | 2 |
| 378 | 2 |
| 379 | 3 |
| 380 | N/A |
| 381 | N/A |
| 382 | N/A |
| 383 | N/A |
| 384 | 1 |
| 385 | 2 |
| 386 | 2 |
| 387 | 3 |
| 388 | N/A |
| 389 | N/A |
| 390 | 1 |
| 391 | 2 |
| 392 | 2 |
| 393 | 3 |
| 394 | N/A |
| 395 | N/A |
| 396 | N/A |
| 397 | 1 |
| 398 | 2 |
| 399 | 2 |
| 400 | 3 |
| 401 | N/A |
| 402 | N/A |
| 403 | N/A |
| 404 | 1 |
| 405 | 1 |
| 406 | 2 |
| 407 | 3 |

Table 6 is an example of the network environment of the FWT 14 at position 2 of FIG. 2C.

TABLE 6

| Channel | SAT |
|---|---|
| 355 | 2 |
| 356 | 3 |
| 357 | 2 |
| 358 | 3 |
| 359 | N/A |
| 360 | N/A |
| 361 | N/A |
| 362 | 2 |
| 363 | 3 |
| 364 | 2 |
| 365 | 3 |
| 366 | N/A |
| 367 | N/A |
| 368 | N/A |
| 369 | 2 |
| 370 | 3 |
| 371 | 2 |
| 372 | 3 |
| 373 | N/A |
| 374 | N/A |
| 375 | N/A |
| 376 | 2 |
| 377 | 3 |
| 378 | 2 |
| 379 | 3 |
| 380 | N/A |
| 381 | N/A |
| 382 | N/A |
| 383 | 2 |
| 384 | 3 |

TABLE 6-continued

| Channel | SAT |
| --- | --- |
| 385 | 2 |
| 386 | 3 |
| 387 | N/A |
| 388 | N/A |
| 389 | N/A |
| 390 | 2 |
| 391 | 3 |
| 392 | 2 |
| 393 | 3 |
| 394 | N/A |
| 395 | N/A |
| 396 | N/A |
| 397 | 2 |
| 398 | 3 |
| 399 | 2 |
| 400 | 3 |
| 401 | N/A |
| 402 | N/A |
| 403 | N/A |
| 404 | 2 |
| 405 | 3 |
| 406 | 2 |
| 407 | 3 |

As is seen by comparing the models shown in Tables 5 and 6, many differences exist therebetween. In addition, for both the examples of the network environment models shown in TABLES 5 and 6, the RSSI for each channel may also be measured, recorded, and compared. The differences between the models may be used by the topology verification module 32 to determine whether position 1 is the same as position 2, as described hereinbelow.

The topology generation module 30 may store an initial model of the network environment in a memory, such as the internal memory of the controller 26 or a peripheral memory device. According to one embodiment of the present invention, the topology generation module 30 generates the initial model of the network environment when the fixed wireless terminal 14 is physically located in its desired fixed location. The topology generation module 30 may also rescan the channels periodically to generate current models of the network environment of the fixed wireless terminal 14. The topology generation module 30 may rescan the environment with enough periodicity to minimize potential fraudulent or abusive use of the mobile qualities of the fixed wireless terminal 14. For example, the topology generation module 30 may rescan the network environment of the fixed wireless terminal 14, for example, constantly or periodically, such as every hour. According to another embodiment, the network environment is rescanned every time the subscriber unit 12 is activated, indicating that a user of the subscriber unit 12 may seek to be connected to the wireless network 10.

The topology verification module 32 is in communication with the topology generation module 30 and compares the generated models of the network environment. For example, the topology verification module 32 may compare a current model of the network environment with a previously generated model. The topology verification module 32 may compare the models by, for example, comparing the identification codes stored in the models. In addition, the topology verification module 32 may, in conjunction with the identification codes, monitor the received signal strength of the signals. If the identification codes for a predetermined number of signals for the actual network environment are different than the identification codes for the previously generated model, the topology verification module 32 may determine that the fixed wireless terminal 14 is not located in the same physical location as it was located when the previous model was generated. According to one embodiment, the topology verification module 32 may determine that the FWT 14 is not in the same location if, for example, more than 20% of the identification codes comprising the models are different. If the topology verification module 32 determines that the fixed wireless terminal 14 is not located in its previous location (i.e., if the topology verification module 32 determines that the fixed wireless terminal 14 is mobile), the topology verification module 32 may establish a remedy such as, for example, denying a user of the subscriber unit 12 access to the network for a predetermined period of time. The topology verification module 32 may allow for more than one determination that the fixed wireless terminal 14 is mobile before initiating remedial actions. For example, if the topology verification module 32 determines that the channel identification codes are different on two different scans within six months, the topology verification module 32 may deny the fixed wireless user access to the network for a period of time, such as twenty-four hours. To support emergency communications, however, the topology verification module 32 may nevertheless permit access to the fixed wireless network 10 if the topology verification module 32 recognizes the attempted access as a recognized emergency, such as if a user calls "911" in the United States.

Because according to different embodiments, as discussed hereinbefore, the topology verification module 32 may use different identification codes to compare network environments, the manner by which the topology verification module 32 determines whether the models sufficiently match may vary. For example, for an embodiment in which the topology generation module 30 generates models of the network environment of the FWT 14 based on the DCC sent on control channels, both the DCC and RSSI may be measured and recorded, as indicated in the examples given in TABLES 3 and 4. For such an embodiment, the topology verification module 32 may compare the DCC for each channel to determine whether they match. However, because of, for example, varying weather, base station loading (when linear amplifiers are used), thermal noise, plant foliage, and environmental noise, the RSSI readings may vary. Accordingly, wireless operators attempt to control all variables to keep essentially the same RSSI at a given location. Thus, for the RSSI readings, the topology verification module 32 may account for factors which may affect the RSSI. For example, because typical operator variations in a wireless network on a given day may be in the order of 10 dB, the topology verification module 32 may set the threshold signal strength variation at, for example, 20 dB per channel, for a determination that the RSSI for a particular channel does not match. Such a threshold, therefore, would permit typical operator variations. However, movement of the FWT 14 of even a few feet could cause RSSI changes in excess of the 20 dB threshold.

The topology verification module 32 may further assign a quality factor to the channels readings of the network environment model for such an embodiment. For example, a non-match of the DCC for any channel could be worth one point and any RSSI change greater than the threshold level for any channel could be worth one point. The topology verification module 32 may tally the points in comparing the models, and disable access to the network 10 any time the total number of points reaches a preset, but configurable, level within a certain period of time, such as twenty-four hours. The topology verification module 32 may utilize a similar comparison technique for an embodiment in which the topology generation module 30 generates models of the network environment of the FWT 14 based on the SAT sent with telecommunication signals on analog voice channels, as described hereinbefore with reference to FIG. 2C.

For an embodiment in which the topology generation module 30 generates the network environment models based on the DVCC sent with telecommunications signal on digital control channels, to determine whether the models sufficiently match, the topology verification module 32 may compare the DVCC for each channel. According to one embodiment, a point value could be assigned for each mismatch, and access the network 10 may be disable any time the point value reaches a preset, but configurable, level within a certain time period.

Figure 3:
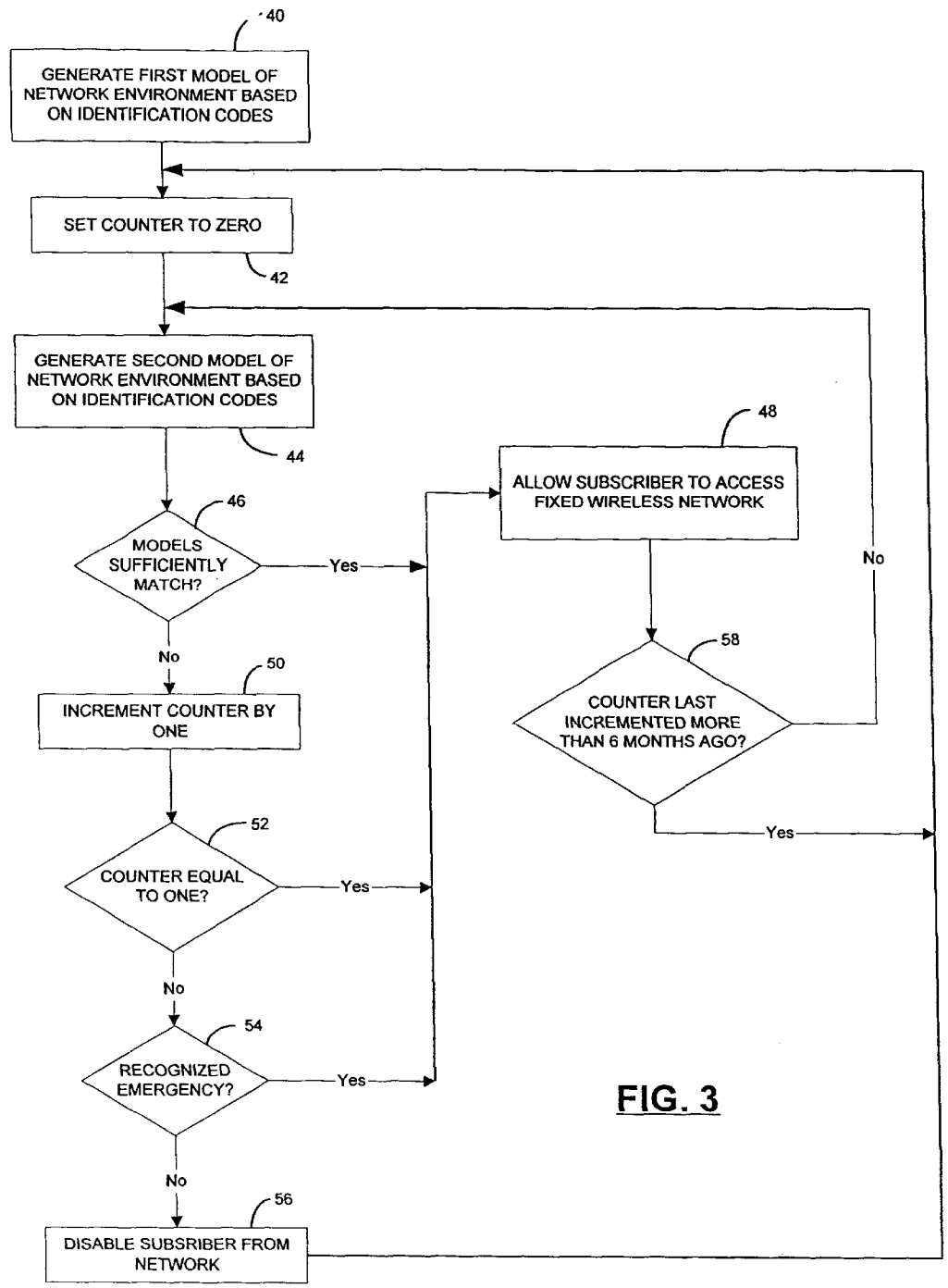
FIG. 3 is a block diagram of the process flow through a controller of the fixed wireless terminal of FIG. 2 according to one embodiment of the present invention.

FIG. 3 is a diagram illustrating a process flow through the controller 26 according to one embodiment of the present invention. The process flow begins at block 40, where a first model of the network environment of the fixed wireless terminal 14 is generated based on the identification codes. For example, the first network environment model may be constructed from the identification codes of the signals transmitted over certain channels, such as the DCC for analog control channels, the DVCC for digital control channels, or the SAT for analog voice channels. In addition, in conjunction with the identification codes, the signal strength of the signals on the channels may be included in the model. As discussed hereinbefore, the first model may be generated when the fixed wireless terminal 14 is located in its desired physical location. From block 40, the process flow continues to block 42, where an internal counter is set to zero.

From block 42, the process flow advances to block 44, where a second model of the network environment is generated. The second model may be generated, for example, a predetermined period of time after the first model is generated. Alternatively, the second model may be generated when the subscriber unit 12 is activated.

From block 44, the process flow advances to block 46, where the first and second network environment models are compared. If the second model sufficiently matches the first model, it is determined that the fixed wireless terminal 14 is likely in the same location as it was when the first model was generated, and the process flow advances to block 48, where the subscriber is permitted to access the fixed wireless network 10. Conversely, if at block 46 it is determined that the models do not sufficiently match, it is assumed that the fixed wireless terminal 14 is not in the same location as when the first model was generated (i.e., the fixed wireless terminal 14 is mobile), and the process flow proceeds to block 50. Whether the models sufficiently match may be determined based, for example, on whether the identification codes of a predetermined number of signals match. In addition, the comparison of the models may monitor the received signal strength to determine whether the RSSI is within the threshold range, as described hereinbefore. According to one embodiment, complete identity between the identification codes is not required so as to minimize the likelihood of false determinations that the fixed wireless terminal 14 is mobile, such as may be caused by reconfigurations of the cells or changing weather phenomena. For such an embodiment, the predetermined threshold may be set to allow for some variation but to reasonably ensure that the fixed wireless terminal 14 is in approximately the same location as it was when the first model was generated. For example, the models may be determined to not sufficiently match where they differ by more than, for example, 20%.

At block 50, the internal counter is incremented by one unit. The numerical quantity of the counter represents the number of times that it has been determined that the fixed wireless terminal 14 is mobile. The process flow then proceeds to block 52, where the value of the counter is checked. If the counter is equal to one, the process flow returns to block 48, and the subscriber is permitted to access the network. Thus, according to the illustrated process flow, access to the network is still permitted despite the fact that on one occasion it has been determined that the fixed wireless terminal 14 is mobile. Conversely, if the counter does not equal one, e.g., if it equals two, the process flow proceeds to block 54.

At block 54, even though the counter is greater than one, the subscriber may nevertheless be permitted to access the network under certain circumstances, such as for emergency purposes. Thus, at block 54, it is determined whether the user of the subscriber unit 12 is seeking to access the network for an identifiable potential emergency purpose, such as if the user of the subscriber unit 12 calls "911" in the United States. If so, the flow proceeds to block 48, and the user is permitted to access the network. Conversely, if the counter does not equal one and access to the network is being sought for other than identifiable emergency purposes, the process flow proceeds to block 56.

At block 56, a remedy is established because the fixed wireless terminal 14 has been determined to be mobile on at least two occasions. According to the illustrated embodiment, the remedy is disabling the subscriber unit 12 from accessing the fixed wireless network 10. According to one embodiment, any user of the subscriber unit 12 would be denied access for a predetermined period of time, such as twenty-four hours. From block 56, the process flow returns to block 42, where the counter is reset to zero, and a subsequent model of the network environment is generated to be compared to the first model.

From block 48, the process flow proceeds to block 58, where it is determined whether the counter was last incremented more than six months ago. If the counter was last incremented more than six months ago, the process flow returns to block 42, where the counter is reset to zero. Conversely, if the counter was last incremented less than six months ago, the process flow returns to block 44, therefore not causing the counter to be reset to zero prior to the generation of a subsequent network environment of the fixed wireless terminal 14. Thus, according to the illustrated embodiment, the subscriber unit 12 is only disabled from the fixed wireless network 10 if it is determined that the fixed wireless terminal 14 is mobile on at least two occasions within a six month time frame.

Other embodiments of the present invention include variations on the embodiment of the process flow illustrated in FIG. 3. For example, a subscriber may be denied access to the network the first time the fixed wireless terminal 14 is determined not to be in its desired location, i.e., when the counter reaches one. In addition, after disabling the subscriber from the network after two determinations that the fixed wireless terminal 14 is mobile, the counter may be reset to one, rather than zero. In addition, at block 58, the time frame could be other than six months, such as one year. Further, the remedy could be other than disabling the subscriber from the network for a period time. For example, the remedy may be a surcharge stipulated in the subscriber service contract. According to another embodiment, the remedy may be to charge the subscriber for mobile rates while the fixed wireless network 14 is mobile, rather than the typically lower fixed wire rates.

According to another embodiment of the present invention, the controller 26 may determine whether the fixed wireless terminal 14 is located in a specific location by monitoring the time of arrival (TOA) of telecommunication signals received from the base stations 16. For example, the fixed wireless terminal 14 may include two antennas 20 located a fixed, known distance apart. The topology generation module 30 may determine the direction of the fixed wireless terminal 14 relative to a particular base station 16 based on the TOA between signals received by the respective antennas 20 from the base station 16. By determining the direction of the fixed wireless terminal 14 relative to an additional base station 16 which is geographically dispersed from the first base station 16, the topology generation module 30 may fix the location of the fixed wireless terminal 14. The topology verification module 32 may compare the current determined location of the fixed wireless terminal 14 as determined by the topology generation module 30 with a prior determined location to determine if the fixed wireless terminal 14 is in the same location or if it is mobile.

According to another embodiment of the present invention, the fixed wireless terminal 14 has one antenna 20, and the controller 26 determines the location of the fixed wireless terminal 14 based on the TOA of received signals transmitted synchronously from at least two base stations 16, such as may be used for certain TDMA-based networks. According to such an embodiment, because the telecommunication signals transmitted from the base stations 16 are synchronized, the time of arrival of the signals from the different base stations 16 is indicative of the fixed wireless terminal's location relative to the base stations 16.

Figure 4:
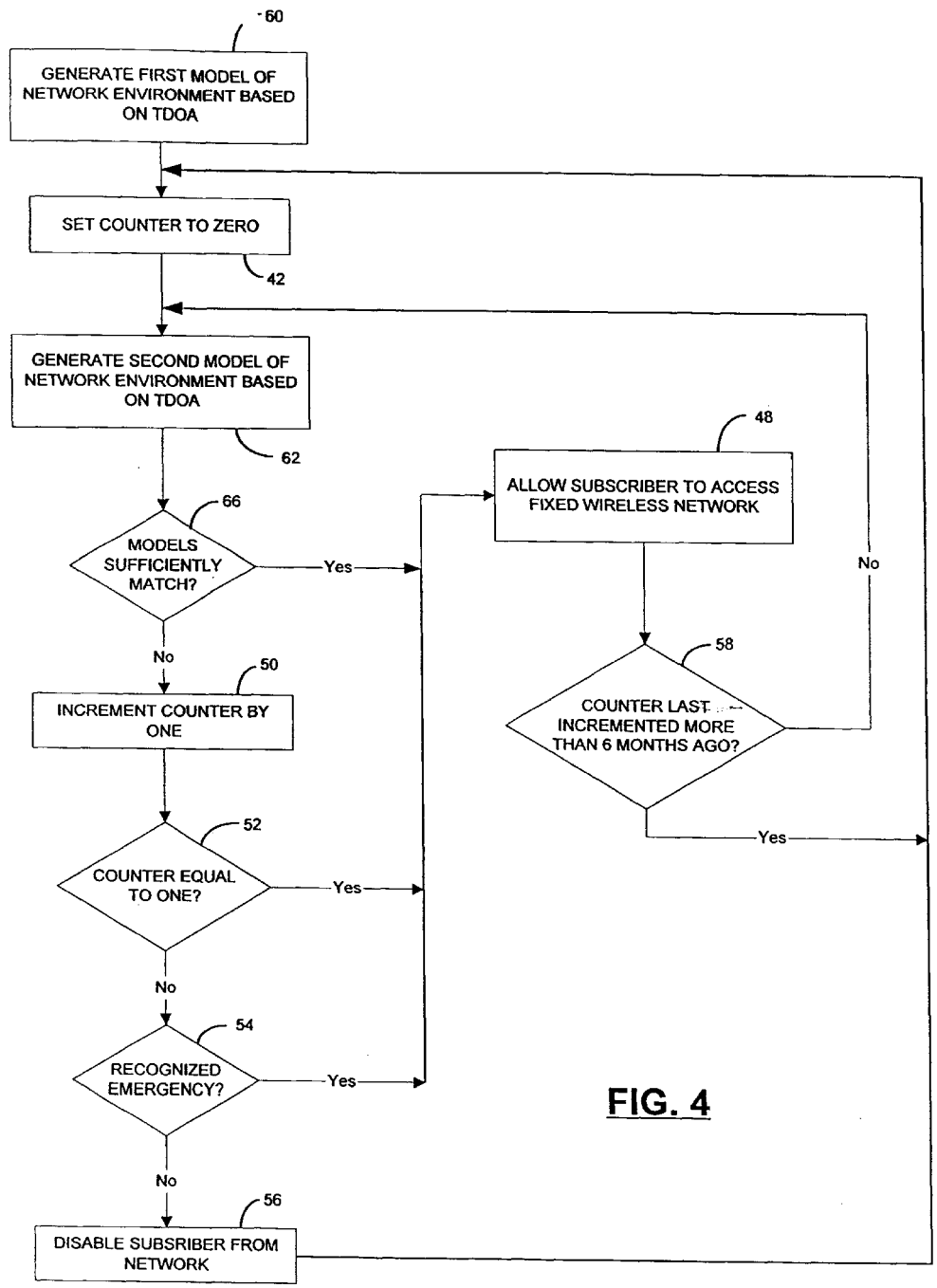
FIG. 4 is a block diagram of the process flow through the controller of the fixed wireless terminal of FIG. 2 according to another embodiment of the present invention.

FIG. 4 is a diagram illustrating a process flow through the controller 26 according to one embodiment of the present invention in which TOA is used to generate the models of the network environment. The process flow illustrated in FIG. 4 is similar to that illustrated in FIG. 3, except at blocks 60 and 62 the models of the network environment are generated based on TOA between received telecommunication signals. In addition, at block 66, the estimated positions of the fixed wireless terminal 14 for each model is compared.

According to another embodiment of the present invention, the controller 26 may fix the location of the fixed wireless terminal 14 by monitoring the received signal strengths (RSSI) of telecommunication signals received by the fixed wireless terminal 14 from the base stations 16. For such an embodiment, the topology generation module 30 may generate models of the network environment by scanning a number of channels from one or more base stations 16 and associating the RSSI of the received signal with each the scanned channels. The model may, for example, include a table identifying the RSSI for each received signal above a particular threshold signal strength and the channel on which the signal was received. The topology verification module 32 may fix the location of the fixed wireless terminal 14 by comparing the network environment models generated by the topology generation module 30 based on the RSSI of the received signals. Whether the models sufficiently match may be determined by whether the RSSI values are within the preset, but configurable, range, as described hereinbefore, which may be set to account for factors which affect the strength of the received signals other than mobility of the FWT 14.

Figure 5:
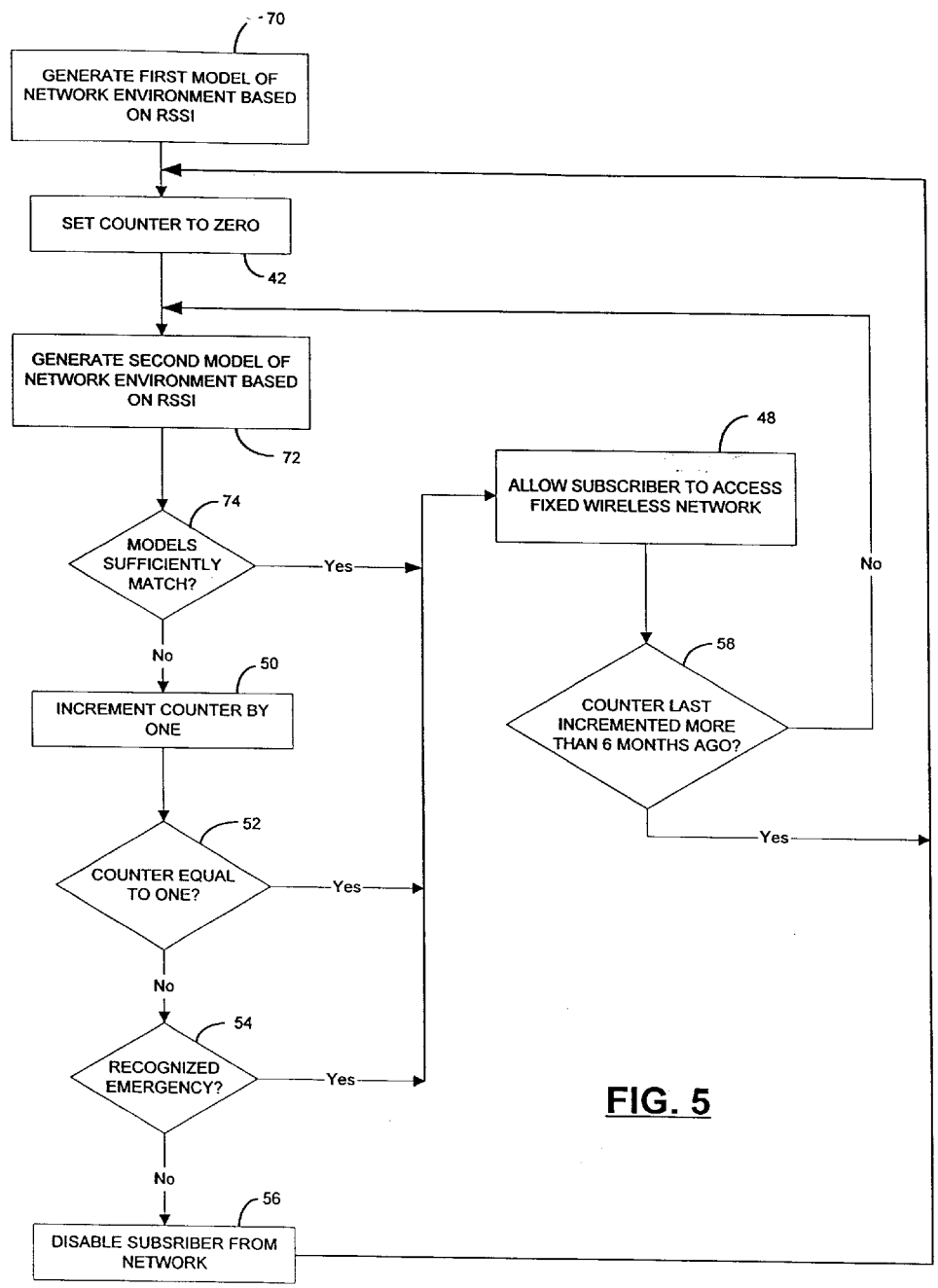
FIG. 5 is a block diagram of the process flow through the controller of the fixed wireless terminal of FIG. 2 according to another embodiment of the present invention.

FIG. 5 is a diagram illustrating a process flow through the controller 26 according to one embodiment of the present invention in which RSSI is used to generate the models of the network environment. The process flow illustrated in FIG. 5 is similar to that illustrated in FIG. 3, except that at blocks 70 and 72 the models of the network environment are generated based on the RSSI of the received telecommunication signals. In addition, at block 74, the network environment models generated according to the RSSI are compared.

While the present invention has been described in conjunction with certain embodiments thereof, many modifications and variations will be apparent to those of ordinary skill in the art. For example, the flow through modules 30 and 32 may be alternatively arranged to still realize the benefit of the present invention. Furthermore, although the invention has been described in terms of a fixed wireless system, the present invention may be embodied in mobile wireless systems. For example, in a mobile wireless system in which usage is restricted or fees vary based on the locations of the user. The foregoing description and the following claims are intended to cover all such modifications and variations.

What is claimed is:

1. A method for fixing a location of a transportable fixed wireless terminal in a fixed wireless network, comprising:
at the transportable fixed wireless terminal:
receiving telecommunication signals transmitted from a first set of base stations;
generating a first model of a network environment of the transportable fixed wireless terminal based on:
a first set of identification codes in the telecommunication signals received from the first set of base stations, wherein each identification code in the first set of identification codes is indicative of a different base station included in the first set of base stations; and
a first set of received signal strengths for the telecommunication signals received from the first set of base stations;
receiving telecommunication signals transmitted from a second set of base stations;
generating a second model of the network environment of the transportable fixed wireless terminal based on:
a second set of identification codes in the telecommunication signals received from the second set of base stations, wherein each identification code in the second set of identification codes is indicative of a different base station included in the second set of base stations; and
a second set of received signal strengths for the telecommunication signals received from the second set of base stations; and
determining whether the first and second models differ beyond a predetermined limit.

2. The method of claim 1, wherein determining whether the first and second models differ beyond a predetermined limit includes comparing the first set of identification codes and the first set of signal strengths with the second set of identification codes and the second set of signal strengths.

3. The method of claim 2, wherein:
generating the first model includes generating the first model of the network environment based on a first set of digital verification color codes in the telecommunication signals received from the first set of base stations; and
generating the second model includes generating the second model of the network environment based on a second set of digital verification color codes in the telecommunication signals received from the second set of base stations.

4. The method of claim 2, wherein:
generating the first model includes generating the first model of the network environment based on a first set of digital color codes in the telecommunication signals received from the first set of base stations; and generating the second model includes generating the second model of the network environment based on a second set of digital color codes in the telecommunication signals received from the second set of base stations.

5. The method of claim 2, wherein:

generating the first model includes generating the first model of the network environment based on a first set of supervisory audio tones in the telecommunication signals received from the first set of base stations; and generating the second model includes generating the second model of the network environment based on a second set of supervisory audio tones in the telecommunication signals received from the second set of base stations.

6. The method of claim 1, further comprising establishing a remedy when the first and second network environment models differ beyond the predetermined limit.

7. The method of claim 6, wherein establishing a remedy includes preventing a user of the fixed wireless terminal from accessing the fixed wireless network.

8. The method of claim 7, wherein preventing a user from accessing the fixed wireless network includes preventing the user from accessing the fixed wireless network for a predetermined period of time.

9. A transportable fixed wireless terminal, comprising:

a transceiver for receiving telecommunication signals from one or more base stations;

an interface in communication with the transceiver;

a topology generation module in communication with the transceiver for generating first and second models of a network environment of the transportable fixed wireless terminal based on telecommunication signals received from the one or more base stations, wherein the first and second models are based on:

identification codes in the telecommunication signals received from the one or more base stations, wherein each identification code is indicative of a base station included in the one or more base stations; and received signal strengths for the telecommunication signals received from the one or more base stations; and a topology verification module in communication with the topology generation module for comparing the first and second models.

10. The fixed wireless terminal of claim 9, wherein the identification codes are digital verification color codes.

11. The fixed wireless terminal of claim 9, wherein the identification codes are digital color codes.

12. The fixed wireless terminal of claim 9, wherein the identification codes are supervisory audio tones.

13. The fixed wireless terminal of claim 9, wherein the topology verification module is further for comparing the identification codes and the received signal strengths associated with the first model with the identification codes and the received signal strengths associated with the second model.

14. The fixed wireless terminal of claim 9, wherein the topology verification module is further for establishing a remedy when the first model and the second model differ beyond a predetermined limit.

15. A transportable fixed wireless terminal, comprising:

a transceiver for receiving telecommunication signals from one or more base stations;

an interface in communication with the transceiver; and a controller in communication with the transceiver and the interface, the controller including a computer-readable medium, having stored thereon instructions, which when executed by the controller, cause the controller to:

generate first and second models of a network environment of the transportable fixed wireless terminal based on telecommunication signals received from the one or more base stations, wherein the first and second models are based on:

identification codes in the telecommunication signals received from the one or more base stations, wherein each identification code is indicative of a base station included in the one or more base stations; and received signal strengths for the telecommunication signals received from the one or more base stations; and compare the first and second models.

16. The fixed wireless terminal of claim 15, wherein the identification codes are digital verification color codes.

17. The fixed wireless terminal of claim 15, wherein the identification codes are digital color codes.

18. The fixed wireless terminal of claim 15, wherein the identification codes are supervisory audio tones.

19. A wireless network, comprising:

a mobile switching center;

a plurality of base stations in communication with the mobile switching center; and a transportable fixed wireless terminal in communication with one or more of the plurality of base stations, wherein the transportable fixed wireless terminal includes:

a transceiver for receiving telecommunication signals from the one or more base stations;

an interface in communication with the transceiver;

a topology generation module in communication with the transceiver for generating first and second models of a network environment of the transportable fixed wireless terminal based on telecommunication signals received from the one or more base stations, wherein the first and second models are based on:

identification codes in the telecommunication signals received from the one or more base stations, wherein each identification code is indicative of a base station included in the one or more base stations; and received signal strengths for the telecommunication signals received from the one or more base stations; and a topology verification module in communication with the topology generation module for comparing the first and second models.

20. The network of claim 19, wherein the mobile switching center is in communication with a public switched telephone network.

21. The network of claim 19, wherein the identification codes are digital verification color codes.

22. The network of claim 19, wherein the identification codes are digital color codes.

23. The network of claim 19, wherein the identification codes are supervisory audio tones.

24. The network of claim 19, wherein the topology verification module is further for establishing a remedy when a first model and a second model differ beyond a predetermined limit.

* * * * *